United States Patent [19]
Palone et al.

[11] Patent Number: 6,116,670
[45] Date of Patent: Sep. 12, 2000

[54] ROTATING JAW ROBOTIC GRIPPER

[75] Inventors: Thomas W. Palone, Rochester; Joseph Yokajty, Webster, both of N.Y.

[73] Assignee: Eastman Kodak Company, Rochester, N.Y.

[21] Appl. No.: 09/223,261

[22] Filed: Dec. 30, 1998

[51] Int. Cl.[7] .................................................. B25J 11/00
[52] U.S. Cl. .................................. 294/119.1; 294/86.41; 414/758; 414/783
[58] Field of Search ............................. 294/119.1, 110.1, 294/86.41, 86.4; 414/741, 758, 763, 772, 783; 901/39

[56] References Cited

U.S. PATENT DOCUMENTS

| | | | |
|---|---|---|---|
| 3,670,912 | 6/1972 | Dunbar | 294/119.1 |
| 3,971,485 | 7/1976 | Hoppey | 294/86.41 |
| 4,256,429 | 3/1981 | Dwyer | 294/119.1 |
| 4,750,132 | 6/1988 | Pessina et al. | 294/119.1 |
| 4,951,990 | 8/1990 | Hollan et al. | 294/119.1 |
| 5,782,515 | 7/1998 | Jehan . | |

FOREIGN PATENT DOCUMENTS

| 2240084 | 7/1991 | United Kingdom | 294/119.1 |
|---|---|---|---|

OTHER PUBLICATIONS

Sommer Automatic, Rotating Jaws diagram, rubber or slotted, for parallel grippers, SB 32/SB40, No Date.

*Primary Examiner*—Dean J. Kramer
*Attorney, Agent, or Firm*—Mark G. Bocchetti

[57] ABSTRACT

An actuating device is taught for use with a robotic arm having a linear actuator which includes an actuated portion and a stationary portion with a tool device supported by the actuated portion. The actuating device includes a bracket attached to the stationary potion of the linear actuator with bracket presenting an engaging surface. There is a mechanical assembly for controlling rotation of parts acquired by the tool device which is attached to the actuated member of the linear actuator of the robotic arm. The mechanical assembly includes a displacement linkage member and a rotatable subassembly. The displacement linkage member contacts the engaging surface when the mechanical assembly is raised to a predetermined height through operation of the linear actuator portion. By raising the mechanical assembly above the predetermined height, the displacement linkage member is caused to drive rotation of the rotatable subassembly. A spring is provided to normally bias the displacement linkage member to a home position.

20 Claims, 10 Drawing Sheets

ROTATING JAW ROBOTIC GRIPPER

FIELD OF THE INVENTION

The present invention relates generally to robotically actuated gripping devices and, more particularly, to actuating systems for robotic tools and gripping devices which use the existing robotic linear actuator to drive additional tool operations.

BACKGROUND OF THE INVENTION

A variety of parts feeders are well known in the prior art. Such parts feeders are often used in the manufacturing industry to present parts for pick and place type operations by a robot. Typically, such parts feeders may include various types of hoppers, vibratory-type bowls or centrifugal-type bowls containing a reservoir or bulk source of parts. These devices are used to separate and orient parts and properly present such parts for subsequent operation such as, for example, a pick and place robot. These part feeding devices are typically capable of feeding one part type or a very small family of parts.

Machine vision based flexible part feeder devices are becoming more widely used across a variety of manufacturing industries. With the use of such vision-based parts feeders, manufacturers are able to add flexibility to their manufacturing processes by designing feeders with the capability of feeding a variety of different parts. Parts feeders which can present a variety of different parts should allow the automated production of smaller volume products by making such automation more cost effective in that the same parts feeding operation can be used to supply parts for a variety of different products. Typically, in operation, parts feeders deliver both parts from a source to a transport service for inspection and subsequent picking therefrom by a multi-axis robot. A vision based inspection system is used primarily to identify which parts may be successfully grasped by the robotic picking device as well as the location of each identified "pickable" part. Flexible parts feeders also typically include a system for recirculating parts which cannot be grasped by the robot such that those parts will ultimately be presented to the robotic picking device, hopefully in a "pickable" orientation.

Parts on the transport surface typically come to rest in a stable orientation which, in many cases, is not the orientation required by the assembly operation or for placement into a part storage tray or part feeding track. The robotic picking device which picks and places these stably oriented parts must have the ability to reorient the acquired part to a more desirable orientation. This function typically requires an additional actuator mounted to the robotic arm in order to rotate the part picked. Certain types of commercially available robotic picking devices are used to accomplish the desired part picking and reorienting functions. Such picking devices may comprise two-position pneumatic and magnetic actuators, as well as various mechanical mechanisms which all add to the complexity, cost and weight of the robotic picking device. Desired additional control of the rotational function of these robotic picking devices in order to reorient the parts may be achieved by incorporating actuators such as programmable stepper motors or feedback-controlled servo motors which further increase picking device complexity, cost and weight.

SUMMARY OF THE INVENTION

It is therefore an object of the present invention to provide a device which allows for the controllable rotation of parts acquired by a robotic picking device.

It is a further object of the present invention to provide a device for rotating an object within the grasp of a robotic picking device which does not require the addition of another motor-driven actuator.

Yet another object of the present invention is to provide another actuation mechanism for use with a robotic arm which relies on the existing motors, pneumatics, and controls of the robotic arm.

A further object of the present invention is to provide a positive displacement remote actuation device for use with a robotic arm which does not require the addition of motors, or pneumatic or hydraulic cylinders to the robotic arm.

Still another object of the present invention is to provide a device for rotatably reorienting component in the grasp of a robotic picking device which utilizes the vertical linear actuation of the robot to cause simultaneous rotation of the component such that the amount of rotation is proportional to the distance traveled in the vertical direction by the robotic picking head such that the amount of rotation can be controlled by controlling the vertical rise of robotic picking head.

Briefly stated, the foregoing and numerous other features, objects and advantages of the present invention will become readily apparent upon the reading of the description, claims and drawings set forth herein. These features, objects and advantages are accomplished by providing an actuating device for use with a robotic arm having a linear actuator which includes an actuated portion and a stationary portion with a tool device supported by the actuated portion. The actuating device includes a bracket attached to the stationary potion of the linear actuator with bracket presenting an engaging surface. There is a mechanical assembly for controlling rotation of parts acquired by the tool device which is attached to the actuated member of the linear actuator of the robotic arm. The mechanical assembly includes a displacement linkage member and a rotatable subassembly. The displacement linkage member contacts the engaging surface when the mechanical assembly is raised to a predetermined height through operation of the linear actuator portion. By raising the mechanical assembly above the predetermined height, the displacement linkage member is caused to drive rotation of the rotatable subassembly. A biasing means is provided to normally bias the displacement linkage member to a home position.

For example, the actuating device of the present invention may comprise a piston attached to a fixed length of cable with the fixed length of cable slidably residing within a sleeve. The piston serves as the actuator. The opposite end of the cable has a button affixed thereto with the button supported from the vertical linear actuator portion of the robotic arm. A cylindrical collar is affixed to the robotic arm above the vertical linear actuator portion which provides an annular engaging surface which presses on the button when the vertical linear actuator is operated to raise the associated tool to a predetermined height. This action drives the button downward thereby causing the cable to slide within the cable sleeve resulting in the piston actuating the tooling to which it has been connected. The remote actuation mechanism may be used, for example, with a robotic gripping device having a gear assembly incorporated therein. The gear assembly includes a spur gear and a pinion gear. A surface of the pinion gear has an O-Ring or vacuum cup mounted thereto to serve as the gripping or part engaging surface. A reciprocating disk interfaces with the spur gear and has a pin extending therefrom. Rotational movement of the spur gear and thus the pinion gear is accomplished by a piston driving against the pin extending from the reciprocating disk. Sliding the cable downward within the sleeve causes the piston to drive against the pin and thereby rotate the gear. Actuation of the cable and thus the piston is accomplished by vertical movement of the robotic arm. During retraction of the extending portion of the robotic arm, the opposite end of the fixed length of cable is driven against the fixed support thereby causing the cable to slide within the sleeve so that the piston drive against the pin. Thus, through movement of the extending portion of the robotic arm in the vertical direction, the precise amount of rotation desired for the gripping mean and thus the part held thereby can be accomplished. A one way clutch insures that the rotation of the gears is in one direction only.

DETAILED DESCRIPTION OF THE INVENTION

Figure 1:
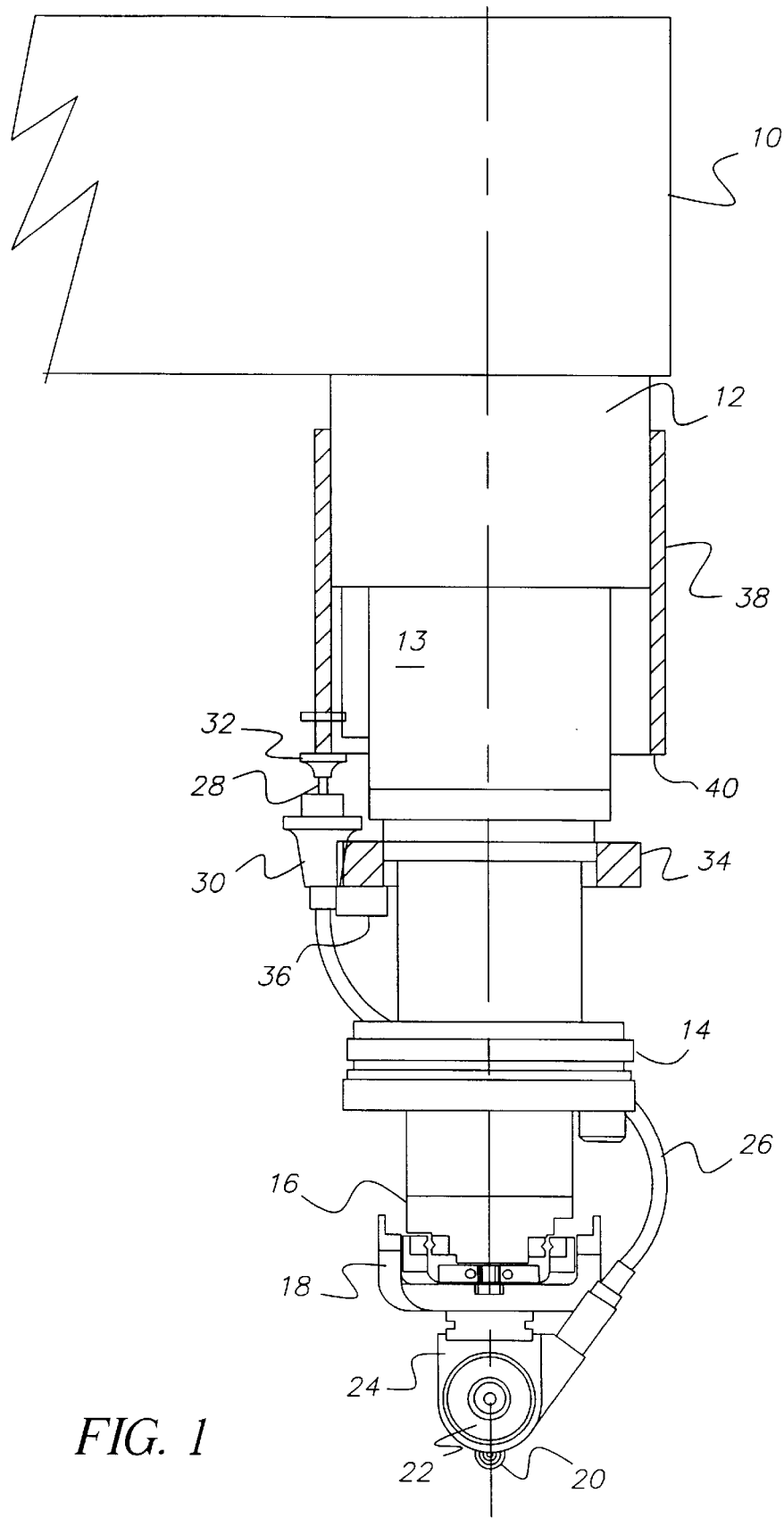
FIG. 1 is a side elevation of a robotic arm and gripping tool including the remote actuation device of the present invention.
Figure 2:
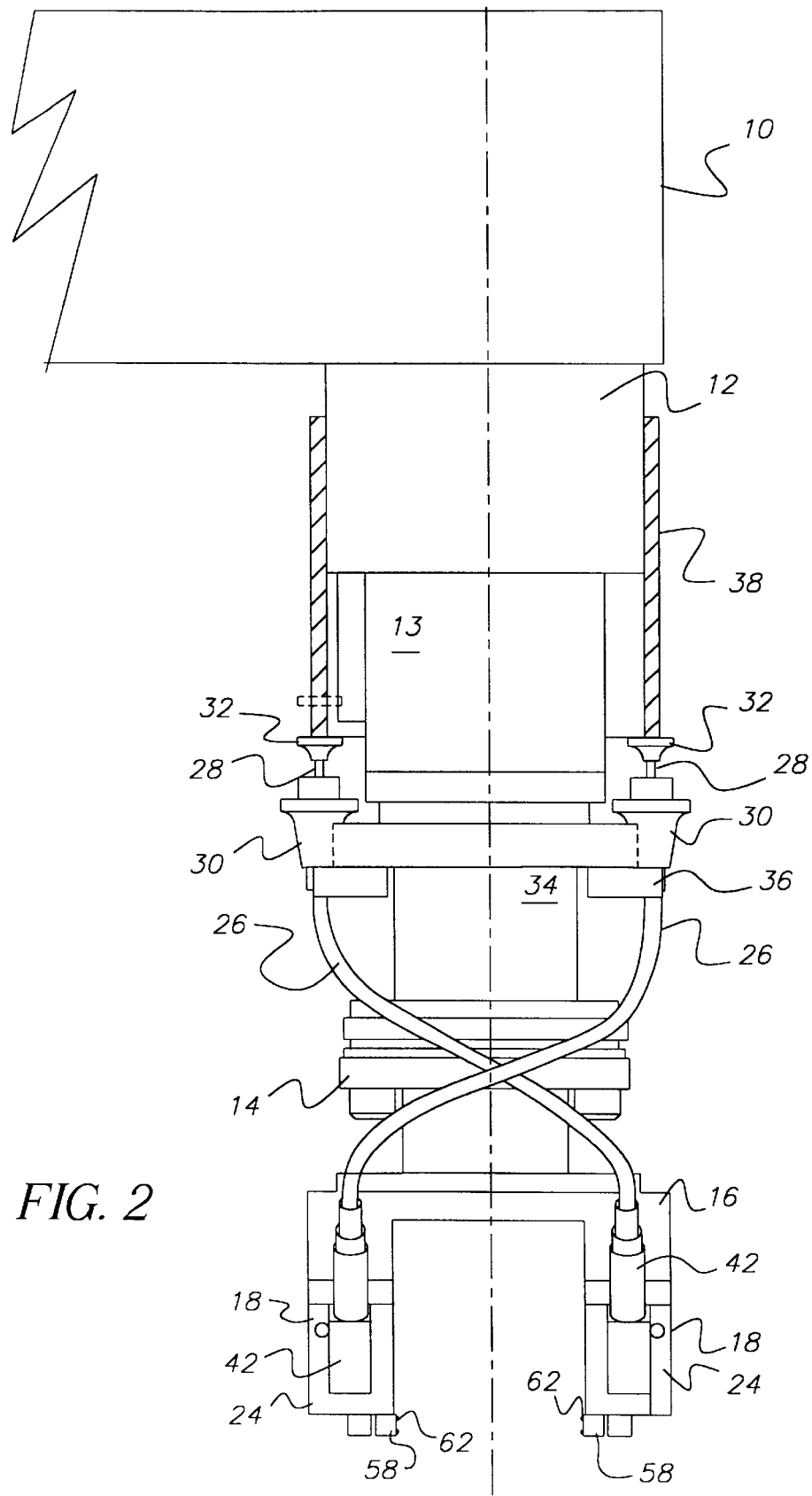
FIG. 2 is a front elevation of the robotic arm and gripping tool including the remote actuation device shown in FIG. 1.

Turning first to FIGS. 1 and 2 there is shown a robotic arm 10 which includes a vertical linear actuator having a stationary portion 12 with an actuated portion 13 extending downward therefrom. Attached to the distal end of actuated portion 13 is tool adapter 14. Attached to tool adapter 14 is a parallel jaw-type robot gripper 16 including jaw members 18 which the robot can cause to move toward and away from one another. At the distal end of each jaw member 18 is a rotatable gripping member 20. Each rotatable gripping member 20 has associated therewith a rotatable subassembly 22 supported within a frame or housing 24 which will be described in more detail hereinafter. Extending from housing 24 is a cable sleeve 26 having a cable 28 therein which in combination serve as a displacement linkage member. There is a cable sleeve collar 30 through which cable 28 extends with cable 28 terminating at button 32. There is a collar 34 affixed to tool adapter 14 with a cable mounting bracket 36 extending therefrom. Cable mounting bracket 36 supports cable sleeve collar 30 and button 32 in a fixed position relative to tool adapter 14 which, of course, can be raised or lowered through operation of the actuated portion 13 of the robotic arm 10. Attached to robotic arm 10 is bracket or cylindrical collar 38 which provides an engaging surface 40 (which is preferably annular) for engaging button 32 when tool adapter 14 is raised to a predetermined height and regardless of the rotational position which may have been achieved by the tool adapter 14 through operation of robotic arm 10. In order to prevent damage to button 32, cable sleeve 26 and cable 28, cable mounting bracket 36 and collar 34 are preferably attached by means of a magnetic coupling thereby allowing detachment of cable mounting bracket 36 from collar 34 if actuated portion 13 is inadvertently translated in the upper direction beyond allowable limits as determined by the overall length of cable 28 and cable sleeve 26 and the amount of travel which can be imparted to the distal end of cable 28 within housing 24.

Figure 3:
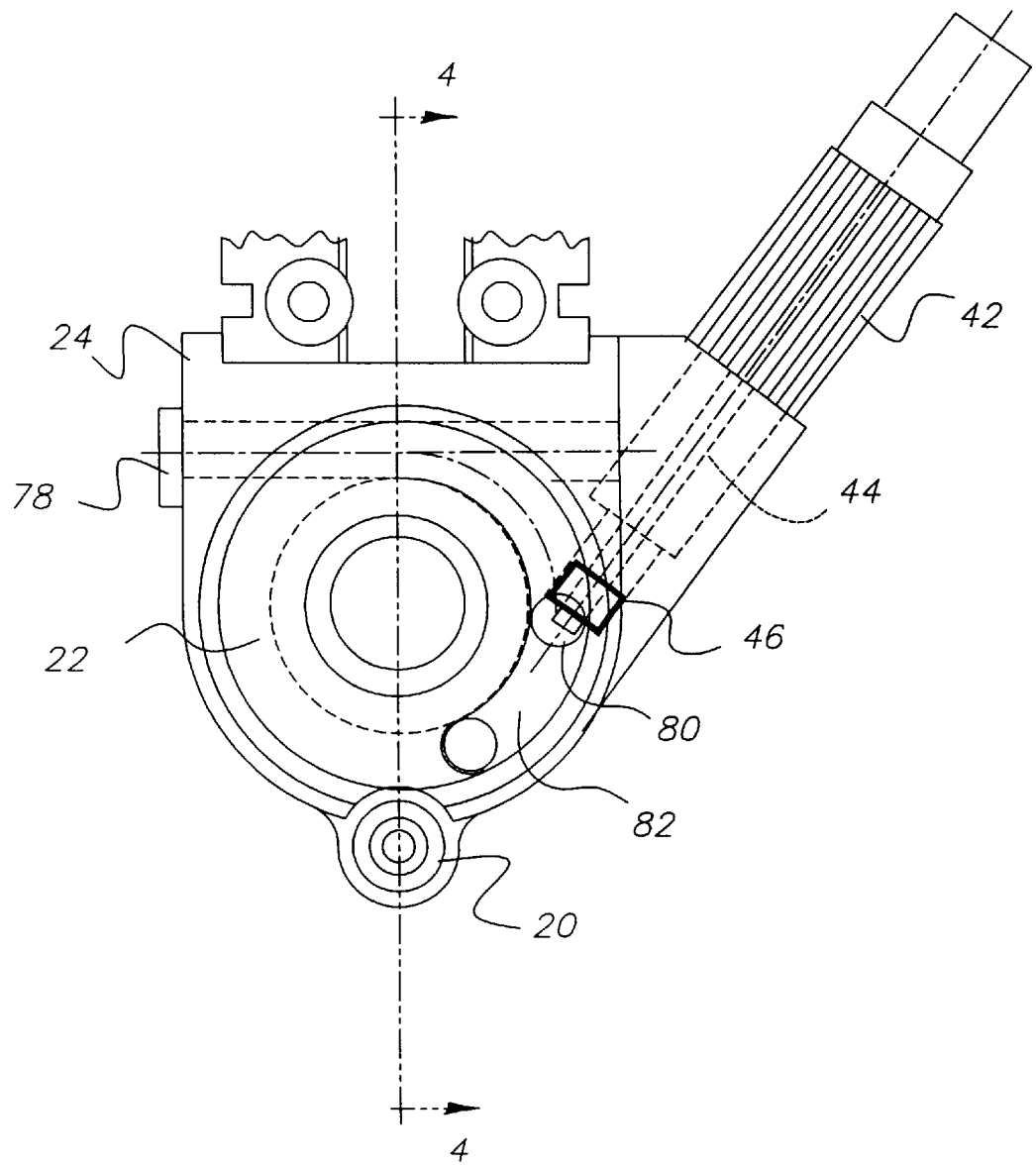
FIG. 3 is an enlarged side elevational of the housing and rotatable subassembly.
Figure 4:
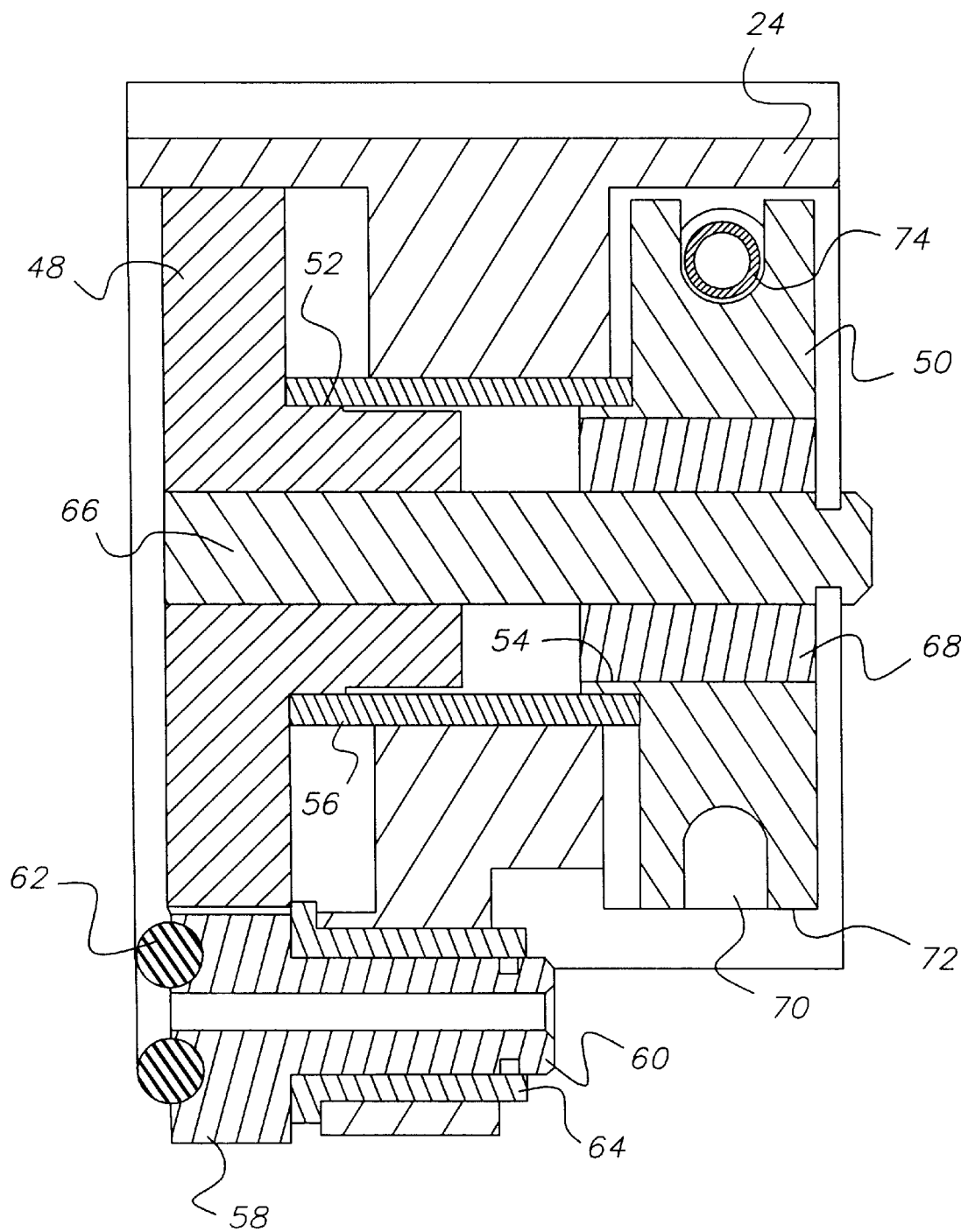
FIG. 4 is a cross sectional view taken along line 4—4 of FIG. 3.
Figure 5:
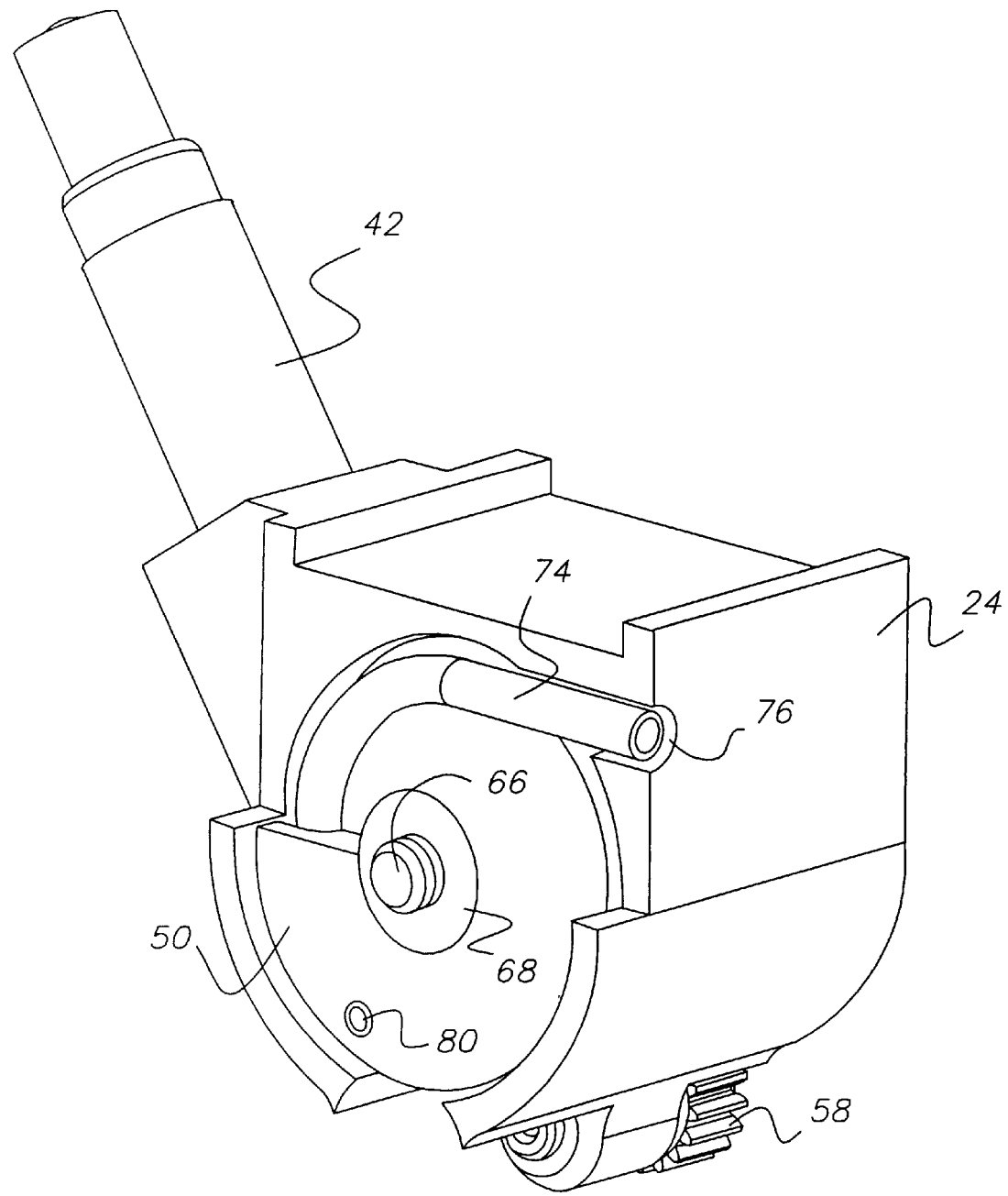
FIG. 5 is a partially cut away perspective view of the housing and rotatable subassembly.

Looking next at FIG. 3 there is shown an enlarged side elevational view of the housing 24, rotatable subassembly 22 and rotatable gripping member 20. Housing 24 includes cable receiving arm 42 having an axially bore 44 there through providing access into housing 24. Cable 28 extends through axially bore 44 and there is a piston 46 affixed to the distal end of cable 28.

Looking next at FIG. 4 through 8, housing 24 and the associated rotatable subassembly 22 are shown in cross section. The rotatable subassembly 22 includes a spur gear 48 and reciprocating disk 50. Spur gear 48 includes a journal 52 extending therefrom. Reciprocating disk 50 includes a journal 54 extending therefrom. Journals 52, 54 are freely rotatable in and supported by journal bearing 56 which is mounted within housing 24. Rotatable gripping member 20 includes a pinion gear 58 with journal 60 extending therefrom and O-Ring 62 attached to the front face thereof. Journal 60 resides within journal bearing 64 which is supported by housing 24.

Extending through both spear gear 48 and reciprocating disk 50 is shaft 66. Mounted about shaft 66 and within reciprocating disk 50 is one way needle bearing clutch 68. There is a circumferential channel 70 in the outside surface 72 of reciprocating disk 50. Circumferential channel 70 provides partial residence spring 74. Spring 74 extends through bore 76 in housing 24 and is affixed to a first and thereof a fitting 78. The opposite end of spring 74 is affixed to pin 80 which is mounted to reciprocating disk 50. A portion of pin 80 extends to an arcuate slot 82 in housing 24. Spring 74 is in tension causing pin 80 to reside normally at the top of arcuate slot 82 and against piston 46. Through actuation of cable 28, piston 46 can be caused to move downwardly through bore 84 to drive pin 80 toward the bottom of arcuate slot 82.

Figure 6:
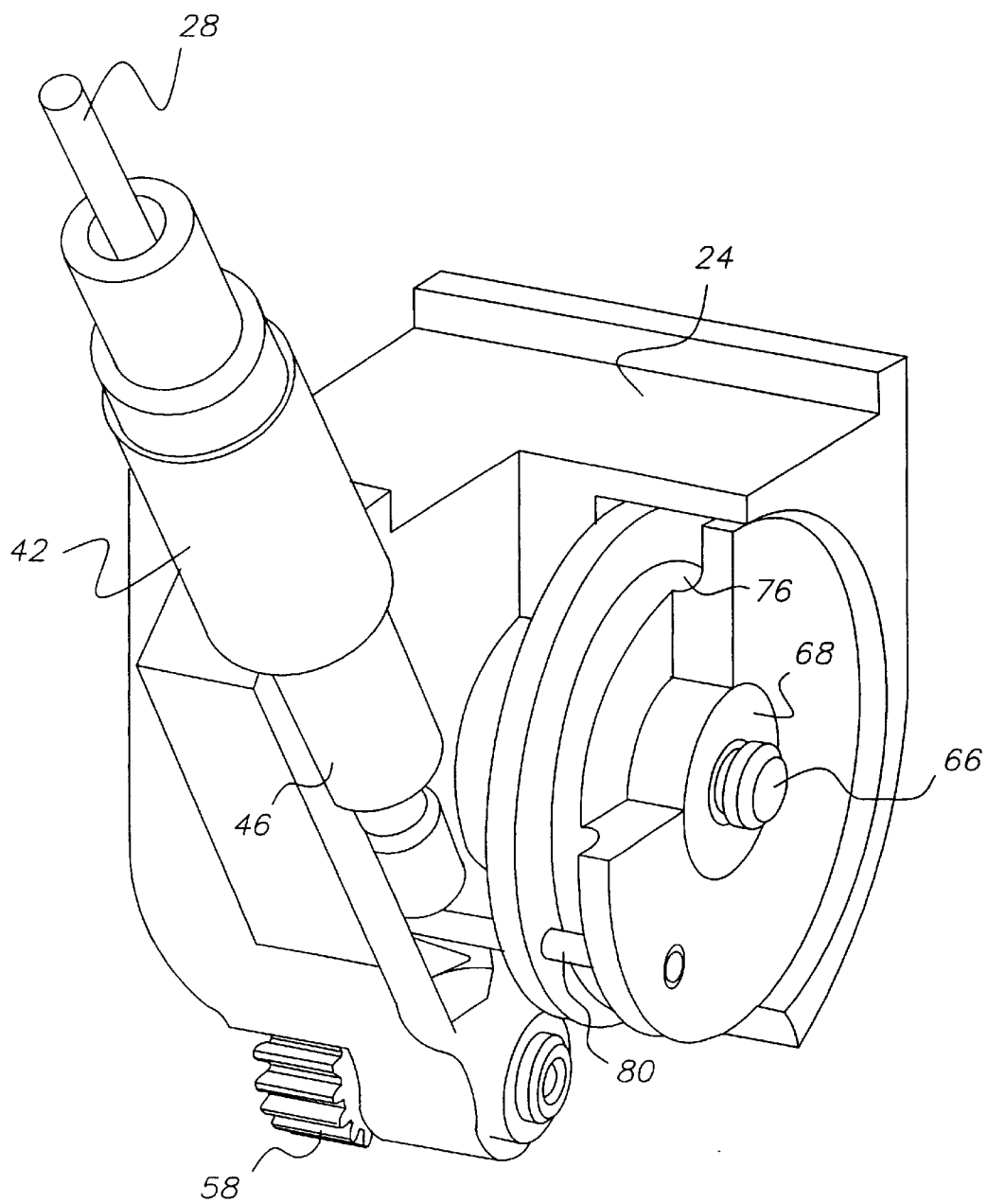
FIG. 6 is another partially cut away perspective view of the housing and rotatable subassembly with the spring removed and the piston and cable shown the home (fully retracted) position.
Figure 7:
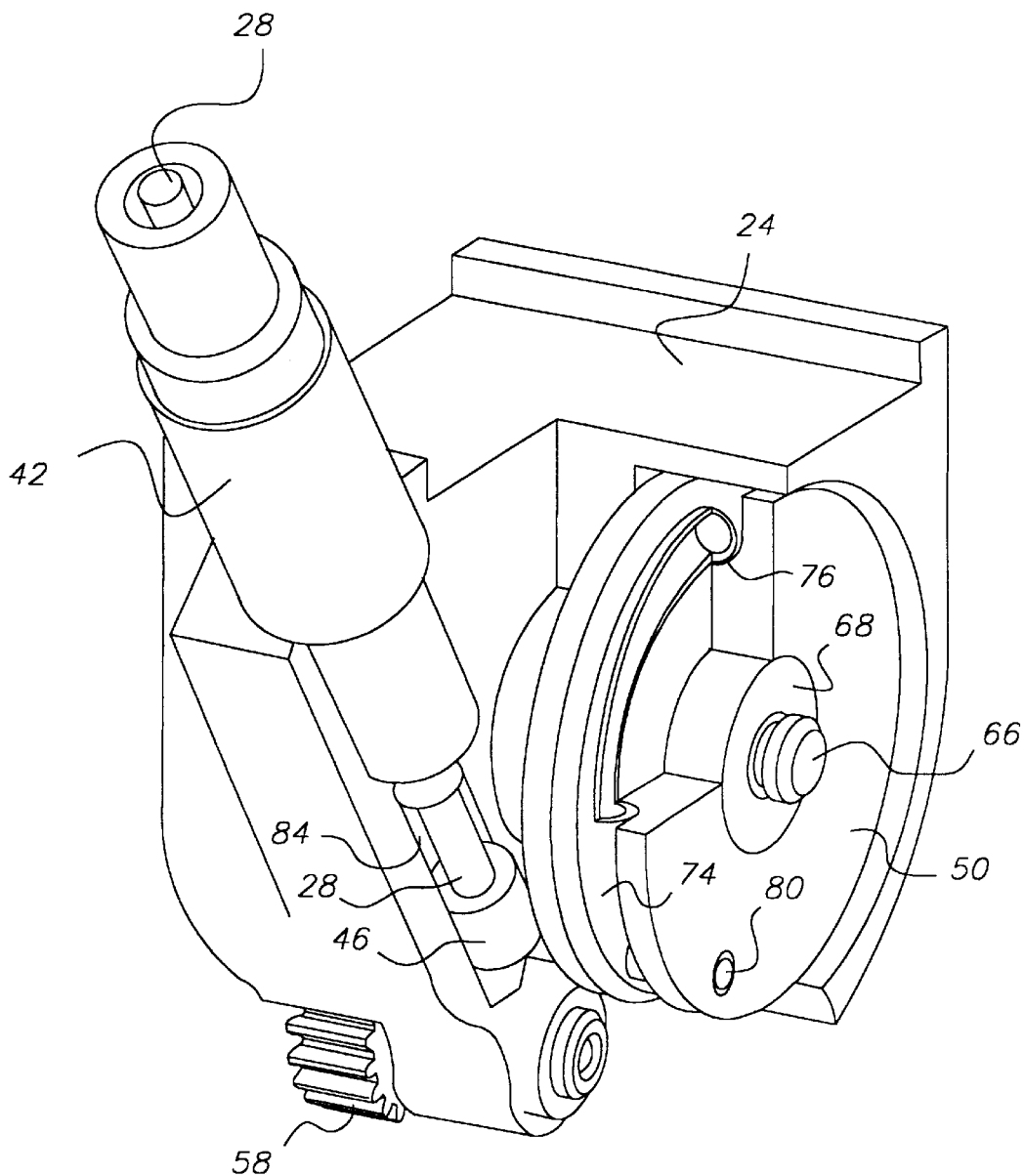
FIG. 7 is the same partially cut away perspective view shown in FIG. 6 with the spring present and the piston and cable shown in an actuated (extended) position.
Figure 8:
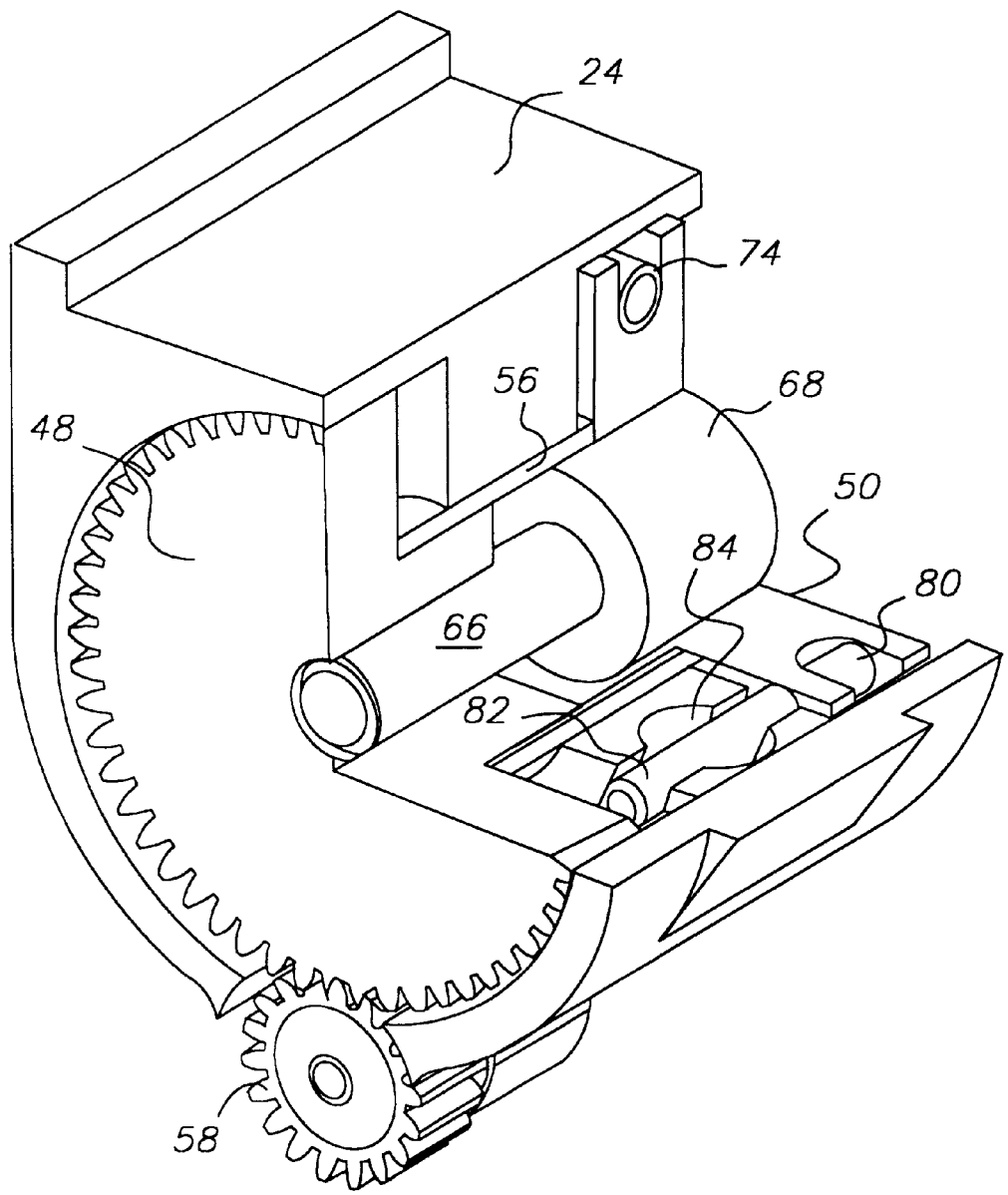
FIG. 8 is a partially sectioned perspective view of the housing and rotatable subassembly.

In the operation of the present invention, cable 28 with piston 46 attached thereto are initially in their home position as shown in FIG. 6. The robotic arm 10 is actuated to position the pads of the two rotatable gripping members 20 on either side of an object to be picked. The parallel jaw-type robot gripper 16 is then actuated to cause jaw members 18 to close upon and grasp the object. After the parallel jaw-type robot gripper 16 has grasped the object, the robotic arm 10 raises the object off of the surface from which the object has been supported utilizing the normal operation of vertical linear actuator of the robotic arm 10. When a predetermined height is attained in raising the object, button 32 engages engaging surface 40 of cylindrical collar 38 thereby displacing cable 28 within cable sleeve 26. Displacement of cable 28 causes piston 46 to drive pin 80 downward to arcuate slot 82 (see FIG. 7). During the forward actuation of piston 46, a torque is applied to rotate shaft 66 by means of the one way needle bearing clutch 68 which is attached to reciprocating disk 50. Rotation of shaft 66 causes rotation of spur gear 48 and pinion gear 58 which intermeshes with spur gear 48. Rotation of spur gears 48 cause rotation of the object of the object grasped therebetween and the amount of rotation inparted to the object is proportional to the amount of displacement of piston 46 in bore 84 caused by the remote actuation of cable 28. Stated another way, the amount of rotation inparted between the object grasped between the pads of pinion gears 58 is proportional to the displacement of pin 80 in arcuate slot 82 caused by the displacement of cable 28 through cable sleeve 26. Thus, for example, if the gear ratio between spur gear 48 and pinion gear 58 is 3 to 1 and the arc prescribed by arcuate slot 82 is 60°, then the object held between the pads of pinion gears 58 may be controllably rotated between 0 and 180 degrees to obtain the particular desired and predetermined orientation of the object.

Once the predetermined rotational orientation of the object has been obtained, the actuated portion 13 of robotic arm 10 may be lowered with button 32 no longer contacting engaging surface 40 of cylindrical collar 38, spring 74 biases pin 80 to move to its home position at the top of arcuate slot 82. Such biasing of spring 74 causes pin 80 to drive piston 46 upward in bore 84 thereby displacing cable 28 through cable sleeve 26 to move button 32 to its normal home position. This reverse rotation of reciprocating disk 50 imparts no torque to shaft 66 due to the operation of one way needle bearing clutch 68. Friction forces within the gear train insure that the one way needle bearing clutch 68 freely rotates on shaft 66 and that spur gear 48 and pinion gear 58 remain rotationally stationary during retraction of piston 46. It should be understood that after retraction of piston 46 the actuated portion 13 may be reactuated such that the button 32 is reengaged by the engaging surface 40 of cylindrical collar 38 thereby imparting additional rotation of the object grasped between the pads of pinion gears 58.

O-Rings 62 serve as the pads for pinion gears 58. It should be appreciated that O-Rings 62 could be replaced with other pad-like surfaces such as, for example, a vacuum cup 86 which could be connected to a vacuum source through robotic arm 10. Such an embodiment would require only a single jaw member 18 in order to pick up an object depending on the weight of the object thereby reducing the complexity, cost and weight of the device.

Although the remote actuation system of the present invention is depicted in FIG. 2 as including a cable 28 and cable sleeve arrangement 26 associated with each of the jaw members 18, it will be understood by those skilled in the art that only one of the rotatable subassemblies 22 must be driven. The system could function equally well with only one cable 28 and cable sleeve 26 arrangement. By driving rotation of only one pinion gear 58, rotation of the opposite pinion gear 58 (or other rotatable support) would be caused by the part grasped therebetween.

It should be appreciated by those skilled in the art that the remote actuation system of the present invention can be employed with mechanisms capable of imparting rotation into objects grasped between jaw members 18 without a gear train such as spur gear 48 and pinion gear 58. For example, if the part being grasped has a planar top surface and it desired that each of such parts is be rotated 90 degrees or less, it would be a relatively simple matter to have freely rotatable gripping means (pinion gears 58 would not have to be gears at all). In that way, piston 46 could be used to press against a predetermined, off-center point of the top surface of the grasped part supported between the rotatable grippers thereby causing the part and rotatable grippers to rotate. The amount of rotation would be proportional to the linear distance travelled by the piston after it had engaged the top surface of the part. After the part has been rotated to the desired orientation, retraction of cable 28 and piston 46 causes the piston 46 to immediately disengage from the part such that part remains in the desired orientation. Cable 28 would, of course, have to biased to return to the home position. Biasing could be accomplished in many ways. For example, a coiled compression spring could be installed about that portion of cable 28 between cable sleeve collar 30 and button 32.

Figure 9:
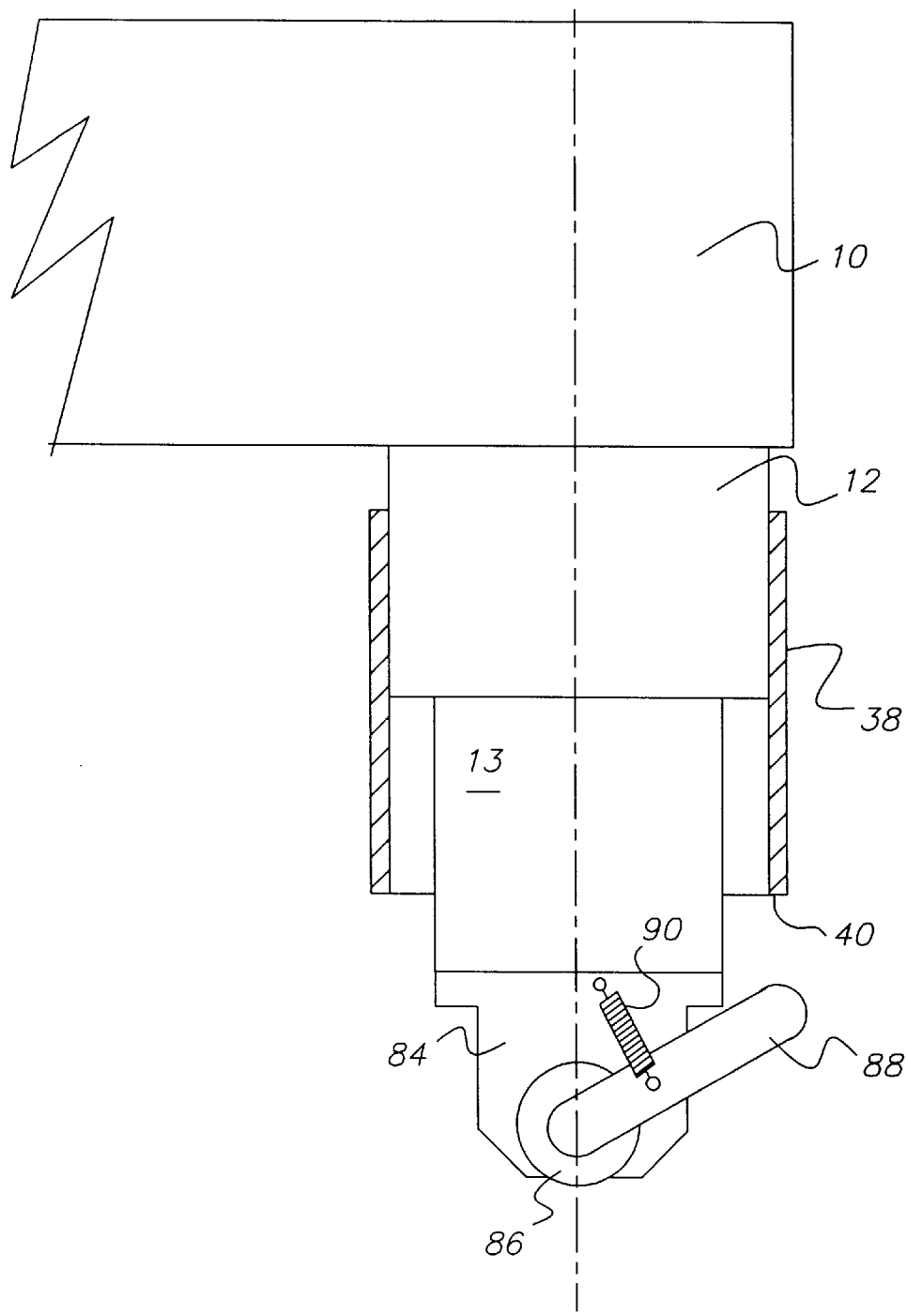
FIG. 9 is a side elevation of a robotic arm and gripping tool including the an alternative embodiment of the remote actuation device depicted in FIGS. 1 and 2.
Figure 10:
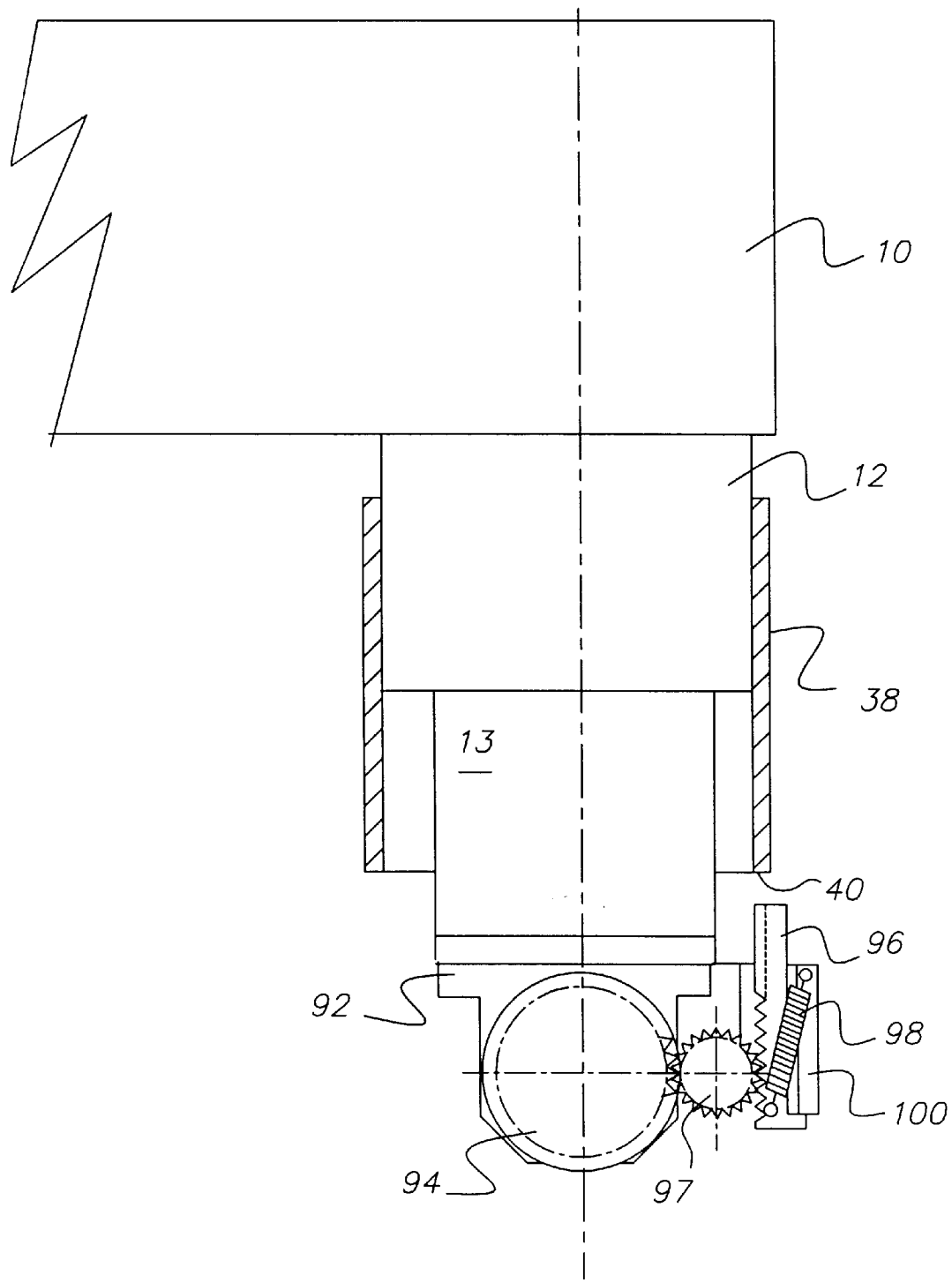
FIG. 10 is a side elevation of a robotic arm and gripping tool including the a second alternative embodiment of the remote actuation device depicted in FIGS. 1 and 2.

Depicted in FIGS. 9 and 10 are alternative embodiments of the actuating device of the present invention shown in FIGS. 1 and 2. Referring to FIG. 9, bracket or collar 38 is affixed to the stationary portion 12 of the vertical linear actuator of the robotic arm 10. Bracket or collar 38 presents an engaging surface 40 which is preferably annular. There is an actuated portion 13 of the vertical linear actuator of the robotic arm having a parallel jaw-type gripping tool device 84 supported therefrom through a tool adaptor (not shown). The parallel jaw-type gripping tool device 84 includes a rotatable subassembly 86 which allows the rotatable gripping members (not shown) to be rotated. Rotatable subassembly 86 can, but need not be, the one way clutch 68, spur gear 48, pinion gear 58, shaft 66 and bearing 56 shown in and discussed with reference to FIG. 4. Extending from the rotatable subassembly 86 is a lever 88 which serves as a displacement linkage member. A spring 90 is attached to both the lever 88 and to the tool device 84 to bias lever 88 to a normal home position. By raising the tool device 84 to a predetermined height through operation of the vertical linear actuator, lever 88 is contacted by engaging surface 40. By raising the tool device 84 above the predetermined height through operation of the vertical linear actuator, lever 88 is actuated by engaging surface 40 thereby driving rotation of the rotatable subassembly 86.

Referring to FIG. 10, bracket or collar 38 is affixed to the stationary portion 12 of the vertical linear actuator of the robotic arm 10. Bracket or collar 38 presents an engaging surface 40 which is preferably annular. There is an actuated portion 13 of the vertical linear actuator of the robotic arm having a tool device 92 supported therefrom through a tool adaptor (not shown). The tool device 92 may be a parallel jaw-type gripping device. The tool device 92 includes a rotatable subassembly 94 which can, but need not be, the one way clutch 68, spur gear 48, pinion gear 58, shaft 66 and bearing 56 shown in and discussed with reference to FIG. 4. Attached to tool device 92 is a rack 96 and pinion 97 which serve as a displacement linkage member. A spring 98 is attached to both the rack 96 and to a rack guide member 100 to bias rack 96 and pinion 97 to a normal home position. By raising the tool device 92 to a predetermined height through operation of the vertical linear actuator, rack 96 and pinion 97 is contacted by engaging surface 40. By raising the tool device 92 above the predetermined height through operation of the vertical linear actuator, rack 96 and pinion 97 is actuated by engaging surface 40 thereby driving rotation of the rotatable subassembly 94.

A variety of other mechanisms which could be incorporated into robotic arm tooling could also be actuated by the remote actuation system of the present invention. Such other systems may employ various mechanical components such as levers, cams, gears and the like to accomplish different mechanical movements which can all be driven by the advancing piston 50 of the remote actuation system of the present invention.

From the foregoing, it will be seen that this invention is one well adapted to obtain all of the ends and objects hereinabove set forth together with other advantages which are apparent and which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth and shown in the accompanying drawings is to be interpreted as illustrative and not in an illuminating sense.

PARTS LIST

10 Robotic Arm
12 Stationary Portion
13 Actuated Portion
14 Tool Adapter
16 Parallel Jaw-Type Robot Gripper
18 Jaw Member
20 Rotatable Gripping Member
22 Rotatable Subassembly
24 Frame or Housing
26 Cable Sleeve
28 Cable
30 Cable Sleeve Collar
32 Button
34 Collar
36 Cable Mounting Bracket
38 Bracket or Cylindrical Collar
40 Engaging Surface
42 Cable Receiving Arm
44 Axial Bore
46 Piston
48 Spur Gear
50 Reciprocating Disc
52 Journal
54 Journal
56 Journal Bearing
58 Pinion Gear
60 Journal
62 O-Ring
64 Journal Bearing
66 Shaft
68 One Way Needle Bearing Clutch
70 Circumferential Channel
72 Outside Surface
74 Spring
76 Bore
78 Fitting
80 Pin
82 Arcuate Slot
84 Parallel Jaw-Type Gripping Tool Device
86 Rotatable Subassembly
88 Lever
90 Spring
92 Tool Device
94 Rotatable Subassembly
96 Rack
97 Pinion
98 Spring
100 Rack Guide Member

What is claimed is:

1. An actuating device for use with a robotic arm having a vertical linear actuator and a tool device attached thereto, said actuating device comprising:

(a) a predetermined length of cable slidably residing in a sleeve, said predetermined length of cable having a proximal end extending beyond a first end of said sleeve and a distal end extending beyond a second end of said sleeve;

(b) a button affixed to said proximal end;

(c) means for supporting said first end of said sleeve from said vertical linear actuator such that said button is raised or lowered when an actuated portion of the vertical linear actuator is raised or lowered; and (d) a collar member attached to the robotic arm above the vertical linear actuator, said collar member presenting an engaging surface for engaging said button when the vertical linear actuator is raised to a predetermined height thereby causing said cable to slide within said sleeve.

2. An actuating device as recited in claim 1 wherein: said second end of said sleeve is attached to said tool device.

3. An actuating device as recited in claim 1 further comprising:
   means for biasing said cable to a home position relative to said cable sleeve.

4. An actuating device as recited in claim 1 wherein:
   said means for supporting said first end is a collar mounted to the vertical linear actuator.

5. An actuating device as recited in claim 4 further comprising:
   a cable mounting bracket affixed to said cable sleeve proximate to said first end, said cable mounting bracket being magnetically supported from said collar.

6. An actuating device as recited in claim 4 further comprising:
   a cable mounting bracket affixed to a cable sleeve terminator attached to said first end of said sleeve, said cable mounting bracket being magnetically supported from said collar.

7. An actuating device as recited in claim 4 further comprising:
   a piston affixed to distal end of said cable.

8. An actuating device as recited in claim 7 further comprising:
   (a) a housing associated with the tool device; and
   (b) a rotatable subassembly in said housing, said piston driving rotation of said rotatable subassembly when the actuated portion is raised above the predetermined height thereby causing said cable to slide within said sleeve.

9. An actuating device as recited in claim 7 further comprising:
   (a) a housing associated with the tool device;
   (b) a reciprocating disk residing in said housing;
   (c) a spur gear residing adjacent said reciprocating disk in said housing;
   (d) a pin extending from said reciprocating disk and having a longitudinal axis;
   (e) an axial shaft extending through said reciprocating disk and said spur gear; said longitudinal axis being parallel said axial shaft and spaced apart therefrom; and
   (f) a one way clutch associated with said reciprocating disk, said one way clutch causing torque to be applied to said spur gear through said axial shaft in only one direction of rotation, said cable extending into said housing with said piston located adjacent said pin, said cable driving said piston against said pin and perpendicular to said longitudinal axis when the vertical linear actuator is raised above the predetermined height thereby causing said cable to slide within said sleeve.

10. An actuating device as recited in claim 9 further comprising:

a pinion gear intermeshing with said spur gear, said pinion gear including a pad for engaging parts to be acquired by the tool device.

11. An actuating device as recited in claim 7 further comprising:

(a) a housing associated with the tool device; and
(b) a rotatable subassembly in said housing, said piston driving rotation of said rotatable subassembly when the vertical linear actuator is raised above the predetermined height thereby causing said cable to slide within said sleeve.

12. A controllably rotatable gripping mechanism for a parallel jaw-type gripping tool for use with a robotic arm, said gripping mechanism comprising:

(a) at least one housing associated with the parallel jaw type gripping tool;
(b) a reciprocating disk residing in said housing;
(c) a spur gear residing adjacent said reciprocating disk;
(d) a pin extending from said reciprocating disk and having a longitudinal axis;
(e) an axial shaft extending through said reciprocating disk and said spur gear; said longitudinal axis being parallel said axial shaft and spaced apart therefrom;
(f) a cable slidably residing in a cable sleeve and having one end thereof extending into said housing, said one end of said cable having a piston affixed thereto; and
(g) a one way clutch associated with said reciprocating disk, said one way clutch causing torque to be applied to said spur gear through said axial shaft in only one direction of rotation, movement of said cable driving said piston against said pin to cause said reciprocating disk to rotate thereby causing said spur gear to rotate.

13. A controllably rotatable gripping mechanism as recited in claim 12 further comprising:

means for biasing said cable to a home position relative to said cable sleeve.

14. A controllably rotatable gripping mechanism as recited in claim 13 further comprising:

(a) a pinion gear supported by said housing and intermeshing with said spur gear;
(b) a gripping pad affixed to said pinion gear, said pinion gear being controllably rotated by causing said cable to slide within said sleeve such that said piston drives said pin in an arcuate path.

15. An actuating device for use with a robotic arm having a linear actuator which includes an actuated portion and a stationary portion with a tool device supported by the actuated portion, said actuating device comprising:

(a) a bracket attached to the stationary portion of the linear actuator, said bracket presenting an engaging surface; and (b) a mechanical assembly for controlling rotation of parts acquired by the tool device, said mechanical assembly attached to the actuated portion of the linear actuator, said mechanical assembly including a displacement linkage member and a rotatable subassembly, said displacement linkage member contacting said engaging surface when said mechanical assembly is raised to a predetermined height through operation of the linear actuator and causing said displacement linkage member to drive rotation of said rotatable subassembly when said mechanical assembly is raised above said predetermined height, said displacement linkage member not contacting said engaging surface when said mechanical subassembly resides below said predetermined height.

16. An actuating device as recited in claim 15 further comprising:

means for biasing said displacement linkage member to a home position.

17. An actuating device as recited in claim 15 wherein:

said displacement linkage member comprises (a) a predetermined length of cable slidably residing in a sleeve, said predetermined length of cable having a proximal end extending beyond a first end of said sleeve and a distal extending beyond a second end of said sleeve;
(b) a button affixed to said proximal end; and
(c) a bracket for supporting said first end of said sleeve from said vertical linear actuator such that said button is raised or lowered when an actuated portion of the vertical linear actuator is raised or lowered.

18. An actuating device as recited in claim 15 wherein:

said displacement linkage member comprises a rack;

a pinion engaging said rack, an end of said rack contacting said engaging surface when said mechanical assembly is raised to said predetermined height through operation of the linear actuator and causing displacement of said rack thereby driving rotation of said pinion which drives rotation of a spur gear in said rotatable subassembly.

19. An actuating device as recited in claim 18 further comprising:

means for biasing said rack to a home position.

20. An actuating device as recited in claim 15 wherein:

said displacement linkage member comprises a lever attached to said rotatable subassembly;

a spring biasing said lever to a home position, said lever including a free end, said free end contacting said engaging surface when said mechanical assembly is raised to a predetermined height through operation of the linear actuator, said lever being actuated when said mechanical assembly is raised above said predetermined height thereby driving rotation of said mechanical assembly.

* * * * *